July 7, 1936. C. A. DUNHAM ET AL 2,047,015
METHOD OF HEATING
Original Filed Aug. 20, 1931 9 Sheets-Sheet 3
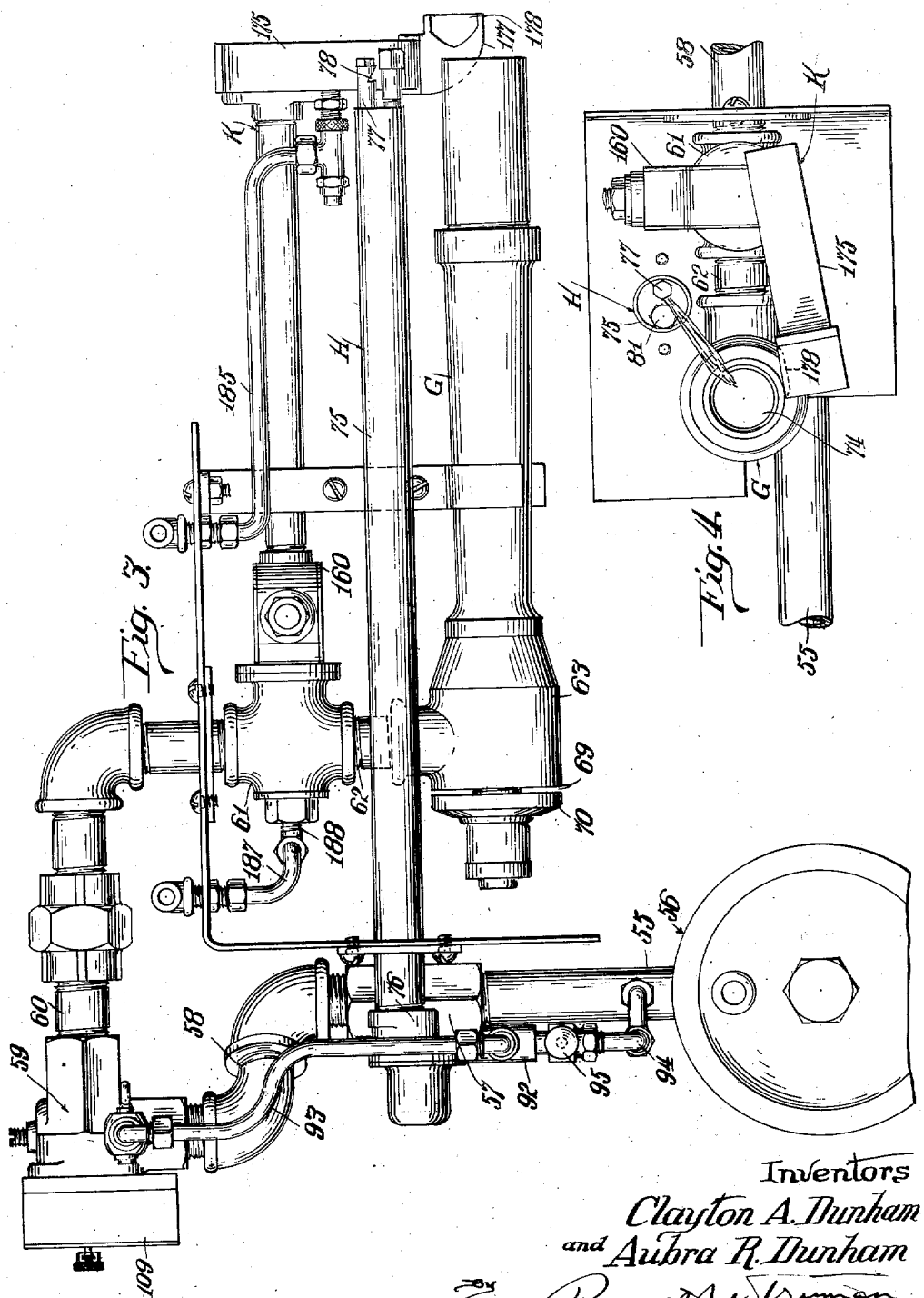
Inventors
Clayton A. Dunham
and Aubra R. Dunham
By Barrett & Vrooman
Attorneys.

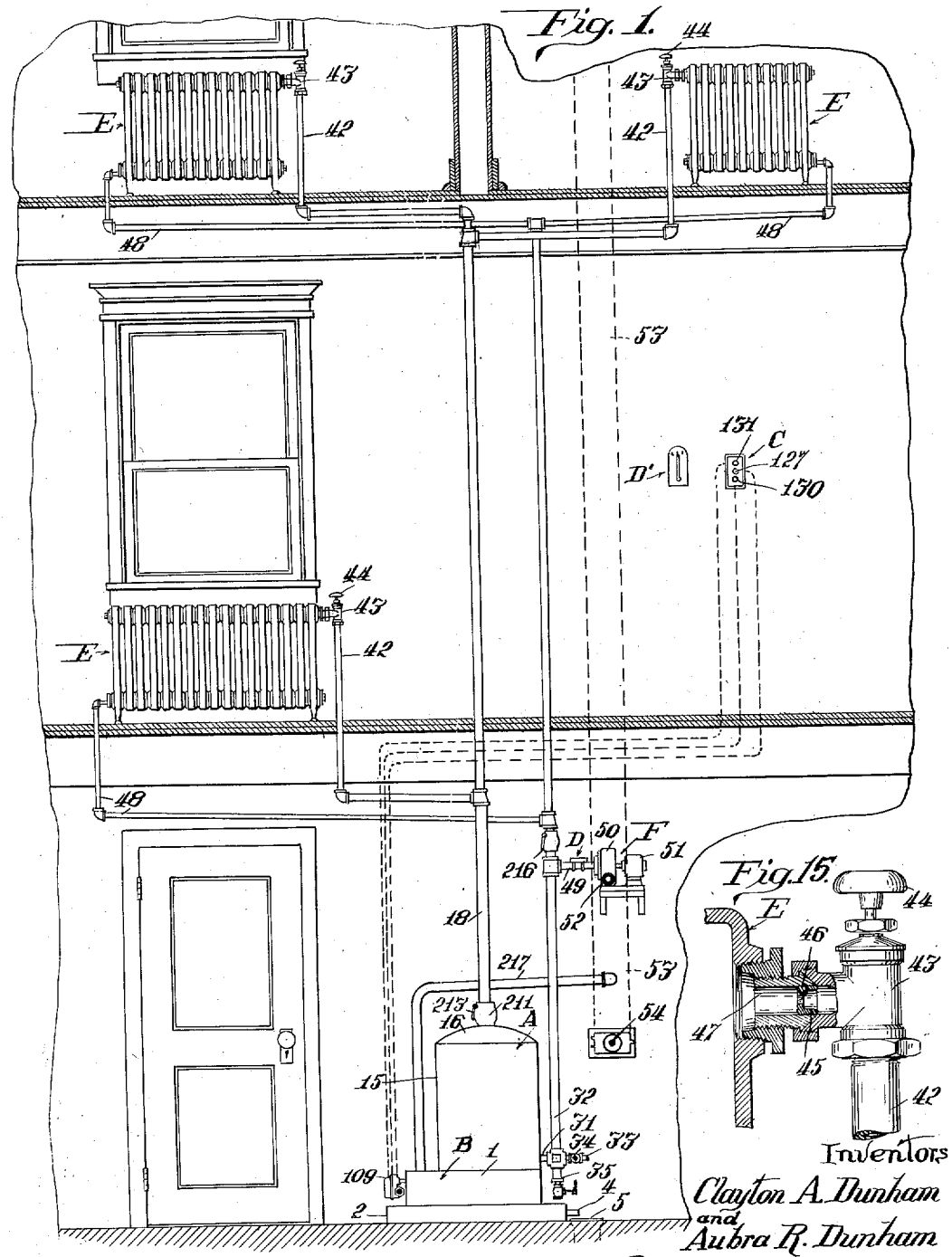

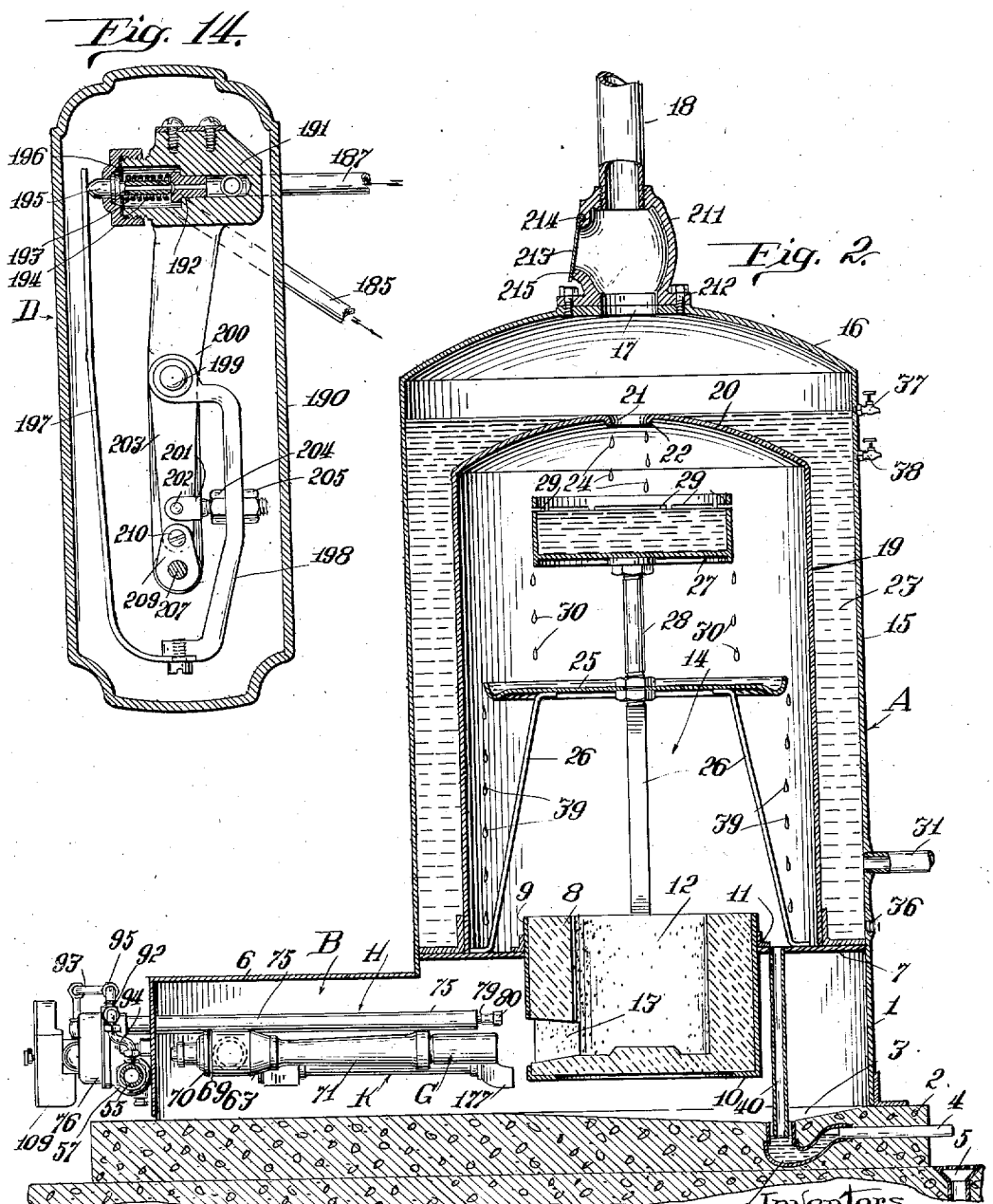

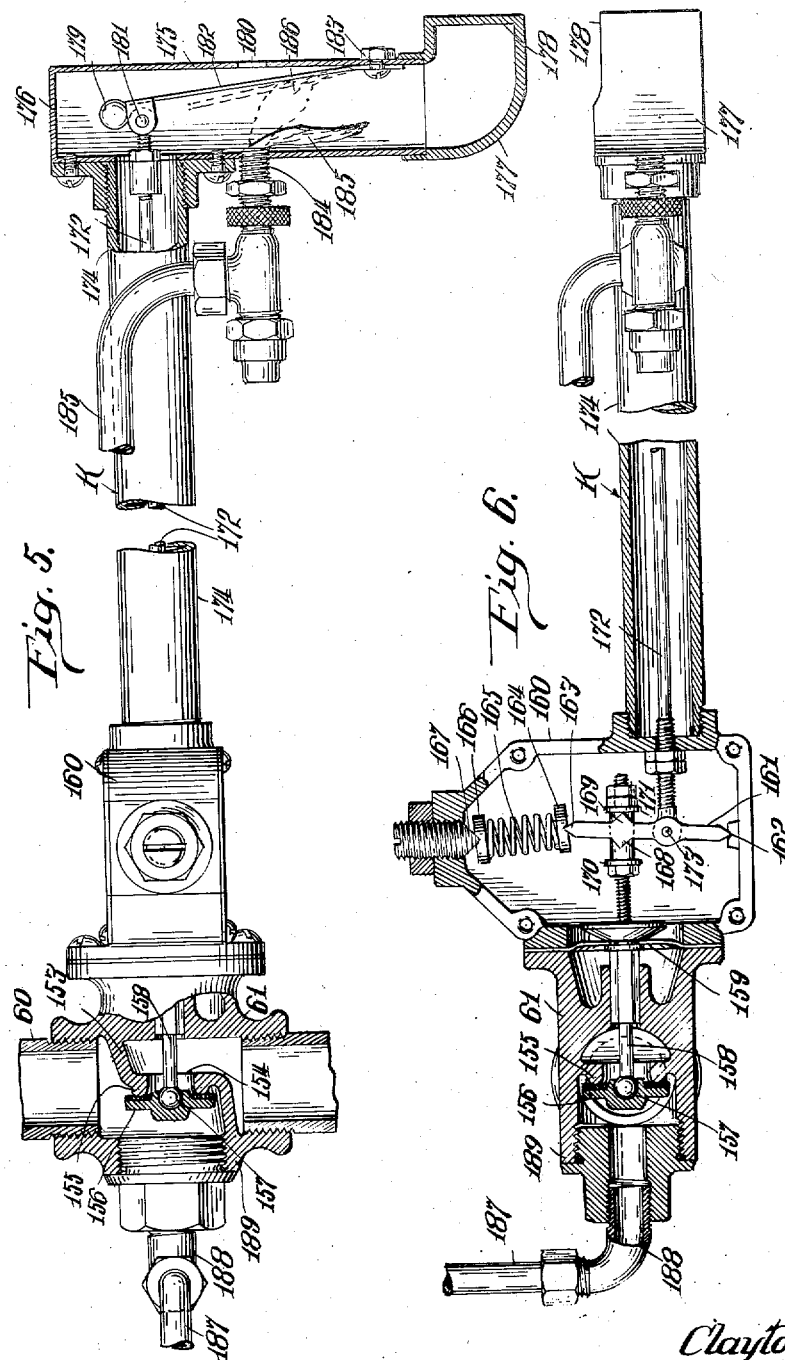

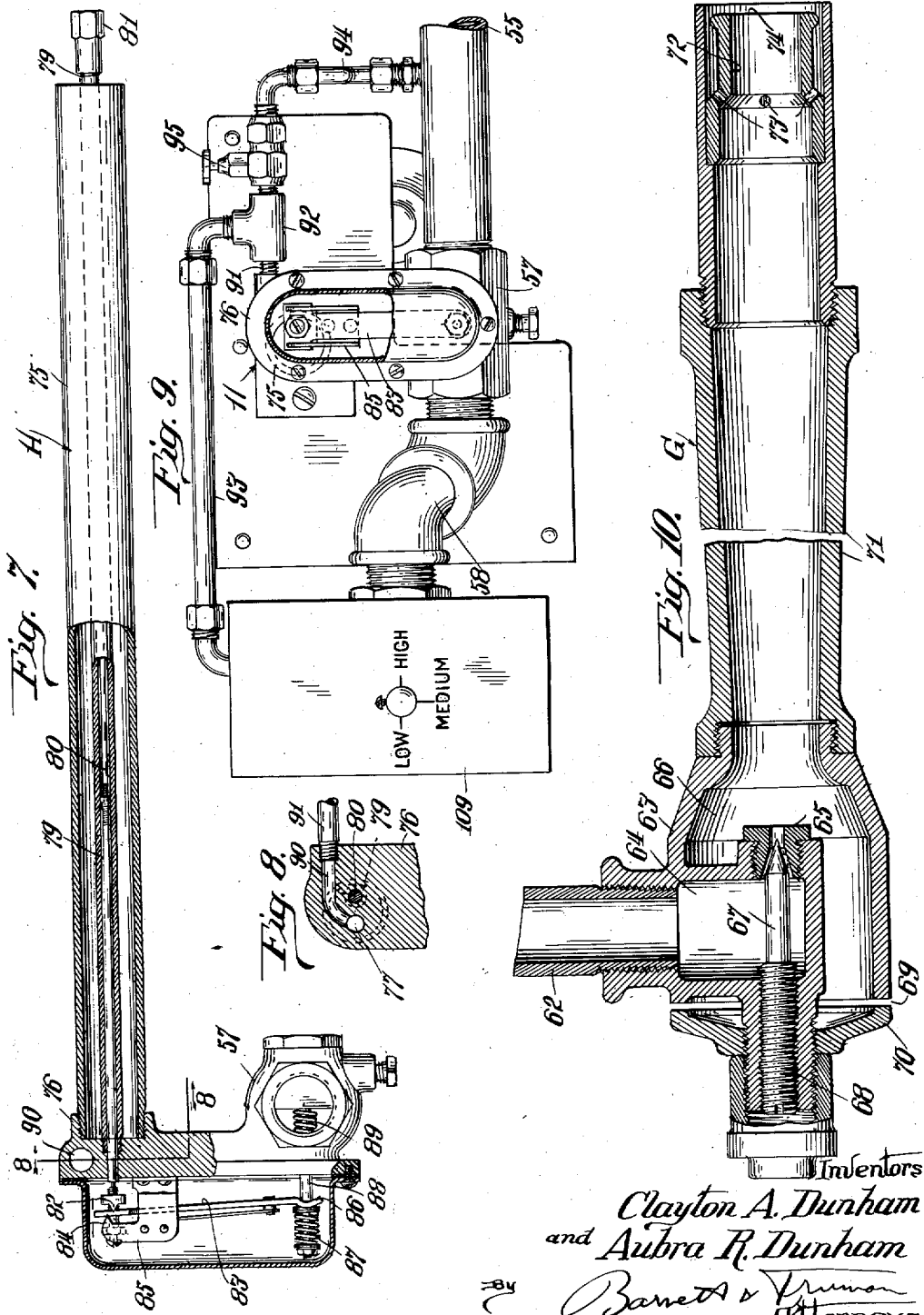

July 7, 1936.　　　C. A. DUNHAM ET AL　　　2,047,015
METHOD OF HEATING
Original Filed Aug. 20, 1931　　9 Sheets-Sheet 6
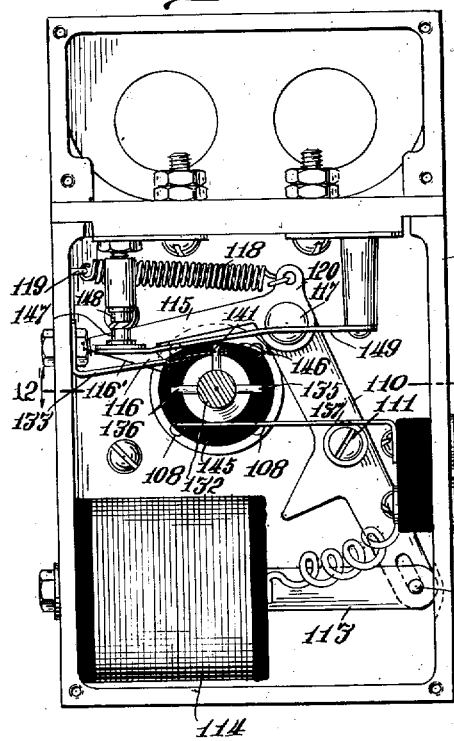
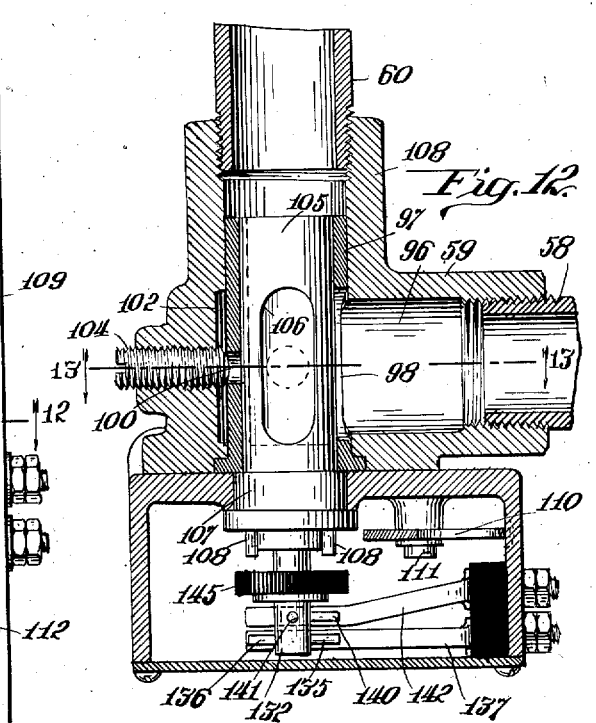
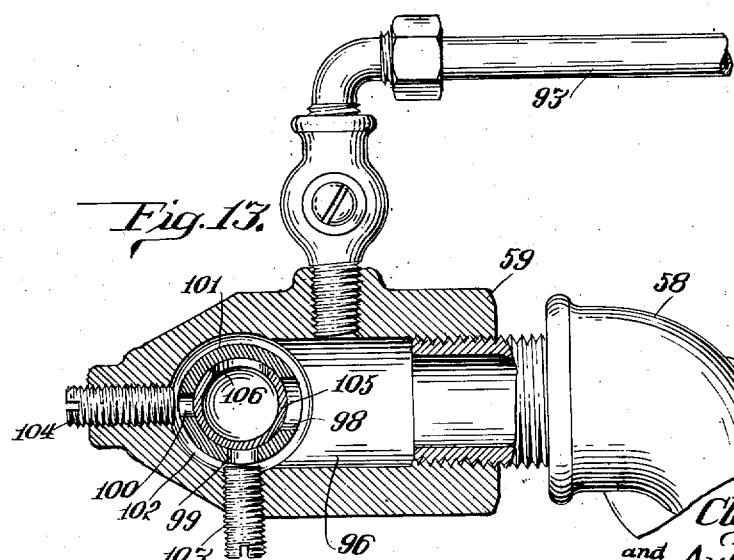
Inventors
Clayton A. Dunham
and Aubra R. Dunham
By Barnett & Truman
Attorneys

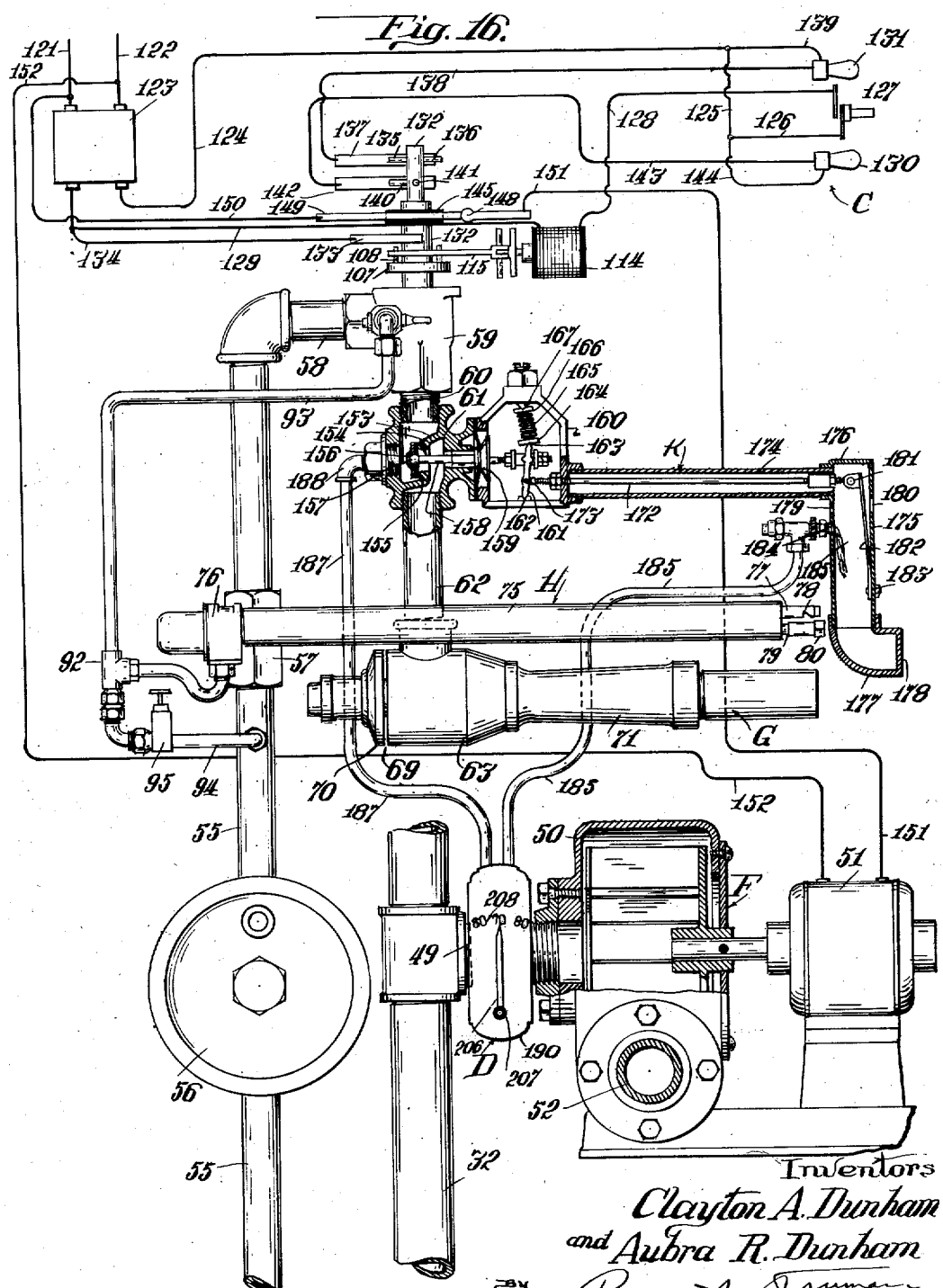

July 7, 1936. C. A. DUNHAM ET AL 2,047,015
METHOD OF HEATING
Original Filed Aug. 20, 1931  9 Sheets-Sheet 8
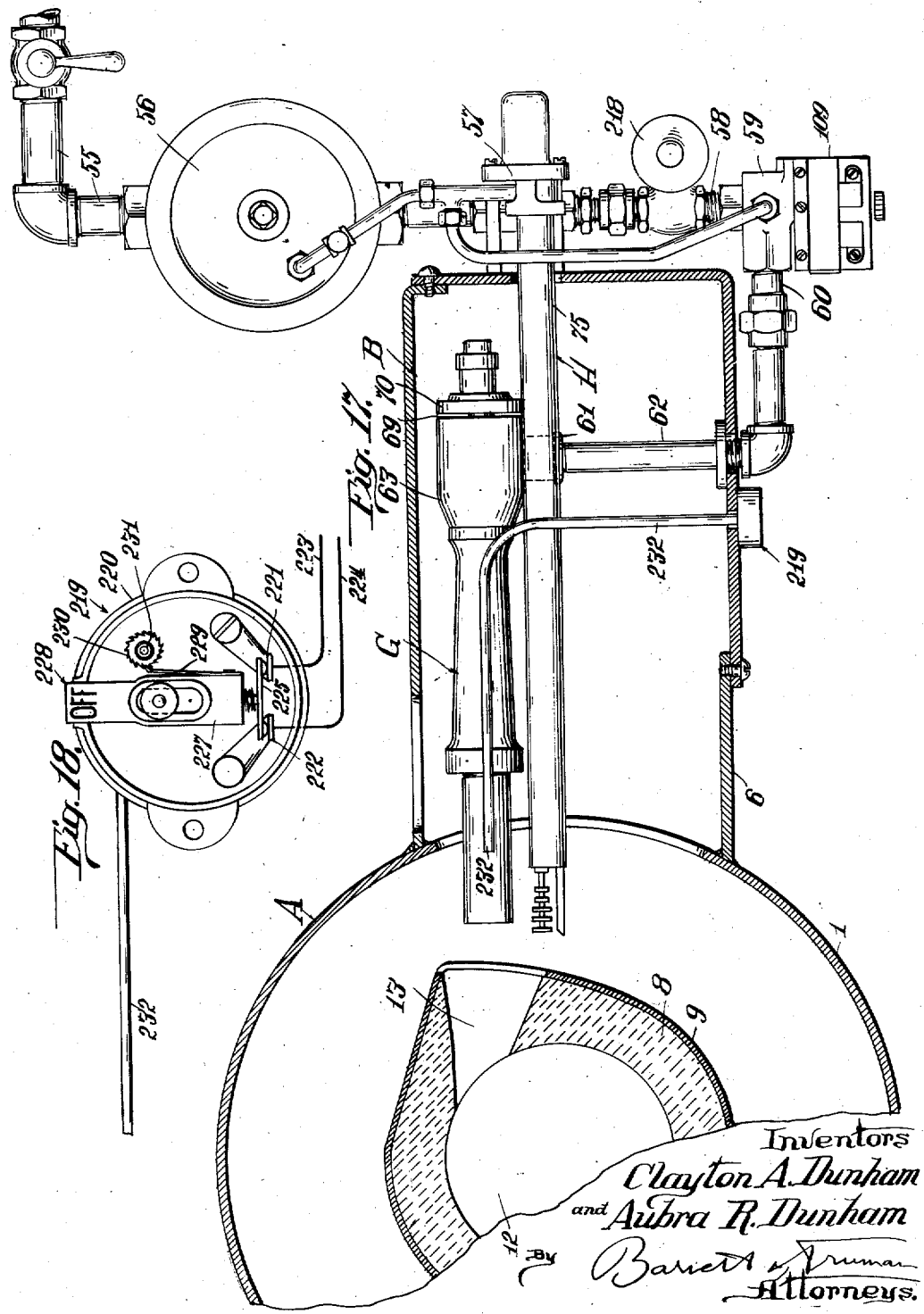
Inventors
Clayton A. Dunham
and Aubra R. Dunham
By Barrett & Truman
Attorneys.

Patented July 7, 1936

2,047,015

UNITED STATES PATENT OFFICE 2,047,015

METHOD OF HEATING

Clayton A. Dunham and Aubra R. Dunham, Glencoe, Ill., assignors to Experimental Laboratories Incorporated, Chicago, Ill., a corporation of Illinois Application August 20, 1931, Serial No. 558,293
Renewed June 12, 1935

10 Claims. (Cl. 237—12)

This invention relates to a new and improved method for heating buildings, and more particularly to a heating system of the internal combustion boiler type in which a heating medium consisting of mixed steam and products of combustion is created and transmitted to and through the radiating system.

The entire heating system is substantially closed from the space within the building, except for the inlet for combustion air, and the system is operated under a reduced pressure produced by a fan or other suction means connected with the outlets of the radiators. This exhausting mechanism draws out from the radiating system and expels to the outer atmosphere the non-condensible gases after they have given up most of their heat in the radiators, and also maintains a reduced pressure in both the radiating system and the generator. Steam condensed in the radiating system is returned by gravity to the generator for re-conversion into steam. The sub-atmospheric pressure maintained in the generator serves to draw in air for combustion purposes, and since the system is operated under reduced pressure, if any leakage occurs, it will be of air into the system rather than the escape of steam or combustion gases therefrom. Control means operable manually from a location in the building remote from the generator is provided for controlling and adjusting the generator burners, and the exhausting mechanism. Signal devices adjacent the manually operable control means indicate the condition at any time of the generator and exhausting apparatus.

Thermostatically operating control means also automatically control the supply of fuel to the burners. A primary pilot flame, which is normally constantly burning, serves to ignite the main burner. Thermostatic means actuated by this pilot burner serves to hold open a main cutoff valve in the fuel supply conduit so that if for any reason this primary pilot burner is extinguished, the supply of fuel to all of the burners will be cut off. A secondary pilot or control burner also operates through thermostatic means to control the flow of fuel to the main burner. The supply of fuel to this secondary pilot is under the control of thermostatic means subject to the temperature of the heating medium or gases at a point remote from the generator. The intensity of this secondary pilot flame is also influenced by the draft of the combustion air caused by the exhausting mechanism, so that the supply of fuel to the main burner will be cut off when, or shortly after, the exhausting mechanism ceases to operate. Certain additional or alternative forms of automatic control mechanism for the burners are disclosed in the specifications which follow.

The present invention relates to certain improvements on and additions to the type of heating system disclosed in our copending applications Serial No. 376,537, filed July 8, 1929, and Serial No. 466,002, filed July 7, 1930. Many of the principles of operation and features of construction utilized in the present improved system are claimed more broadly in these co-pending applications.

The principal object of this invention is to provide an improved method for heating, of the type briefly described hereinabove and disclosed more in detail in the specifications which follow.

Another object is to provide improved remote control means for stopping, starting and adjusting the various features of the apparatus.

Another object is to provide an improved thermostatically controlled means for adjusting the generator fires in accordance with temperature changes at a remote location.

Another object is to provide an improved normally constantly burning pilot burner, with co-operating thermostatic means for cutting off the fuel supply to all burners when this pilot burner is extinguished.

Another object is to provide a secondary pilot or control burner adapted to actuate means for controlling the fuel supply to the main burner in accordance with temperature changes at a point remote from the generator, and also in accordance with variations in the draft of the combustion air produced by the exhausting mechanism.

Another object is to provide an improved blow-back safety mechanism adapted to cut off the supply of fuel in case of a back-fire from the generator.

Other objects and advantages of this invention will be more apparent from the following detailed description of certain approved forms of apparatus adapted for carrying out the principles of the invention.

In the accompanying drawings:

Fig. 1 is a general diagrammatic elevation of the heating system.

Fig. 2 is a central vertical section through the generator.

Fig. 3 is a plan view of the burner and control valve assembly.

Fig. 4 is an end elevation looking from the right at the structure shown in Fig. 3.

Fig. 5 is a plan view, partially in section, of the secondary or control pilot and the valve operated thereby.

Fig. 6 is a side elevation, partially in section, of the structure shown in Fig. 5.

Fig. 7 is a side elevation, partially in section, of the main pilot burner.

Fig. 8 is a detail section, taken substantially on the line 8—8 of Fig. 7.

Fig. 9 is an end elevation of the control valve assembly, looking at the left at the assembly shown in Fig. 3.

Fig. 10 is a longitudinal horizontal section through the main burner.

Fig. 11 is a front elevation, with the cover plate removed, of the electrically operated valve and switch mechanism.

Fig. 12 is a horizontal section, taken substantially on the line 12—12 of Fig. 11.

Fig. 13 is a vertical section, taken substantially on the line 13—13 of Fig. 12.

Fig. 14 is a vertical section through one of the thermostatically controlled valves.

Fig. 15 is a partial elevation and partial vertical section showing one of the radiator inlet valves.

Fig. 16 is a diagrammatic assembly showing a wiring diagram and the fuel-feed connections, parts being shown in section.

Fig. 17 is a horizontal section showing a modified form of burner assembly.

Fig. 18 is an elevation, partially in vertical section, showing the safety thermal cut-off switch.

Figure 19:
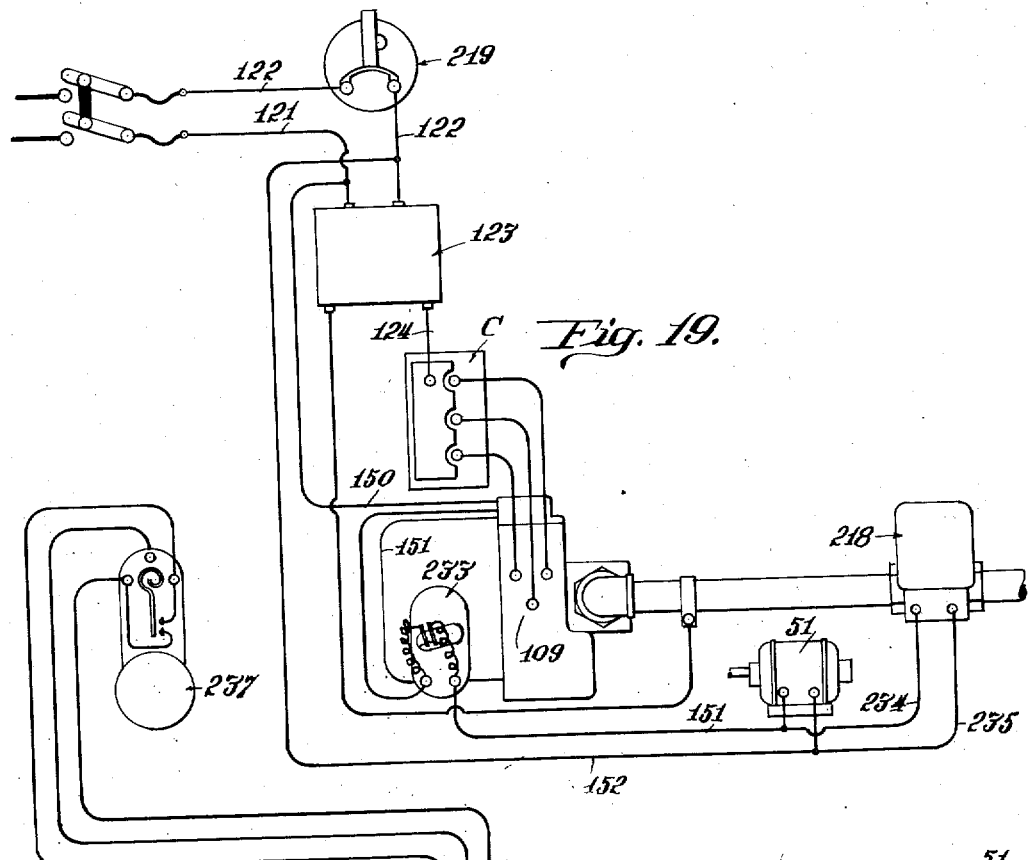
Fig. 19 is a wiring diagram showing a modified form of control assembly.

The main elements of the apparatus are a generator for the heating medium indicated at A, a burner assembly and control mechanism indicated generally at B, a manually operated remote control and signal mechanism C, thermostatically operated temperature control devices indicated at D and D', a radiating system E comprising the several radiators E, and the exhausting mechanism indicated at F. The burner assembly comprises the main burner G, the primary pilot burner H, and the secondary or control pilot K (see Fig. 3).

Referring first more particularly to Figs. 1 and 2, the generator A may take a variety of forms, a preferred form of generator being here disclosed by way of example. An essential characteristic of this generator is that it is entirely closed except for the inlets for water, fuel and combustion air, and the outlets for the heating medium and excess water. None of these, except the inlet for combustion air, has any direct connection with the atmosphere within the building so that a reduced pressure may be maintained within the generator and the escape of fluid therefrom is prevented. The generator may be made of metal or suitable refractory materials, or both, preferably comprising an outer metallic shell covered with suitable insulating material (not here shown) in order to prevent heat losses. A lower substantially closed metallic housing 1 rests upon and is sealed to a concrete supporting base 2 formed with the sump 3, from which leads drain pipe 4 which may empty into the sewer connections indicated at 5. A side extension 6 of the lower casing 1 houses the burner and control valve mechanism, indicated generally at B. Suitably mounted in and supported by the metallic cover plate 7 of lower casing 1 is the main lower combustion chamber 8 formed of suitable refractory material. The refractory shell 8 for the combustion chamber may be supported in a metallic casing 9 formed with a lower inwardly extending supporting flange 10 and supported from cover plate 7 by the angle brackets 11. The central cylindrical combustion chamber 12 is open at its upper end and provided adjacent its lower end with a tangential inlet opening 13 through which the fuel and flame from main burner G, and the combustion air, enter the combustion chamber 12. Due to this tangential opening, the combustion fluids and flame take a spiral or spinning path through the combustion chamber 12, whereby a very long flame and complete combustion may be attained almost entirely within the relatively small combustion chamber before the hot products of combustion pass out into the mixing chamber 14, thereabove.

The outer substantially cylindrical metallic shell 15 of the steam generator and mixing chamber is supported by the cover plate 7 or forms an upward extension of lower casing 1. The dome or cover 16 of casing 15 leads up to a central outlet opening 17 with which communicates the main outlet or supply pipe 18, through which the heating medium is conducted to the radiating system E. The inner metallic shell 19 is mounted at its lower end on cover plate 7 and is formed at its top with a dome 20 provided with a central opening 21 through the downwardly extending cylindrical overflow flange 22. This central opening 21 is also in vertical alignment with the outlet conduit 18 and serves as an outlet for the heating medium from the mixing chamber 14 within inner casing 19. The annular space 23 between inner and outer shells 19 and 15 is normally filled with water up to the level of overflow opening 21, through which excess water flows downwardly into chamber 14, as indicated by the drops 24. A shallow flash plate or pan 25 is supported by legs 26 from cover plate 7, the flash plate 25 being positioned substantially centrally within the mixing chamber 14. A water-heating pan or receptacle 27 is supported beneath overflow opening 21 by the central post 28 extending upwardly from flash plate 25. The upwardly extending side walls of pan 27 are provided near their upper edges with a circumferentially extending series of restricted outlet openings or slots 29. The water falling at 24 through overflow opening 21 will accumulate in heating pan 27 up to the level of outlet openings 29 through which the heated water, which has not already been vaporized, will overflow as indicated at 30, onto the flash pan 25. The purpose of the overflow openings 29 is to secure a better distribution of the overflow water in case heating pan 27 is not exactly level.

A water supply pipe 31 communicates with the annular water space 23, this pipe leading from the lower portion of return pipe 32 through which condensate is returned to the generator. A supply pipe 33 leading from the outside water supply and provided with cut-off valve 34 also communicates with the water inlet pipe 31. A scale-collecting pocket and drain connection 35 may be provided at the lower end of water return pipe 32. At 36 is a drain plug whereby the annular chamber 23 may be drained and flushed out, and 37 and 38 are pet-cocks to test the upper water level. As additional water slowly accumulates in space 23, due to the return of condensate from the heating system, the water will overflow through opening 21 into heating pan 27 and thence overflow onto flash pan 25, as already described.

In operation the highly heated products of conbustion rising from combustion chamber 12 pass under and around the flash plate 25 so as to convert all or the greater portion of the film of water thereon into steam. These products of combustion also contact with the water falling through or from overflow opening 21, as indicated at 24, and from heating pan 27, as indicated at 30, whereby additional steam is generated. The rising products of combustion will highly heat the water in pan 27, so that some steam will be generated from this body of water, and so that the water which drops onto the flash plate 25 will already be raised to a high temperature. The hot gases rising through mixing chamber 14 will heat the annular body of water in chamber 23 so that additional steam is generated from this water, all of the mixed gases consisting of steam and products of combustion passing out through the main supply pipe 18 to the radiating system. It will be noted that the mixing chamber 14 is entirely closed at its lower end except for the inlet opening for the flame and combustion air at 13 through combustion chamber 12, and the only outlet being through the supply main 18 through which the heating medium passes out. The entire generator will preferably be protected by an outer covering of insulating material (not here shown) so that the heat losses will be minimized, and practically all of the heat generated is carried out to the radiating system by the heating medium discharged through pipe 18.

Since practically all of the condensate from the radiating system is returned to the generator through pipes 32 and 31, and since additional water is always being formed in the combustion process from the hydrogen in the gas and the oxygen in the air, there will ordinarily be a surplus of water supplied to the generator. Any excess of water that is not vaporized on flash pan 25 will overflow, as indicated at 39, and then drain out through pipe 40, preferably provided at its lower end with water-seal 41, thence flowing through drain pipe 4 to the sewer connection at 5.

The heating medium passes from supply main 18 through the respective risers 42 and inlet valves 43 into the several radiators E. While only three radiators have here been shown by way of example, it is to be understood that a greater number of radiators can be used. Each inlet valve 43 comprises the usual cut-off valve operated by handle 44, and a metering plate 45 provided with a central orifice 46 is interposed at some selected position in the conduit system, as here shown between the valve chamber and the passage 47 leading into the radiator E. The orifice 46 in plate 45 will be proportioned to meter the right proportion of heating medium to each radiator, depending upon the size, volume and condensing capacity of the radiator. It will be understood that when valve 43 is closed, practically no heating medium is admitted to the radiator, but when the valve is opened a restricted flow of heating medium is admitted to the radiator through the orifice plate 45. Discharge pipes 48 lead from the respective radiators E into the vertical return main 32, in the lower portion of which the condensate from the radiators accumulates and flows back through pipe 31 into the generator A.

At a point somewhat above the water level in the generator A, a branch pipe 49 leads from return main 32 to the exhausting apparatus F. This exhausting apparatus comprises a suitable fan or other suction device 50, driven by electric motor 51 and adapted to draw non-condensible gases from return main 32 through pipe 49 and discharge these gases through pipe 52 into the outlet flue or chimney indicated in dotted lines at 53 (Fig. 1). At 54 is a vent through which additional air may enter flue 53 for the purpose of keeping the humidity within the flue to a desired low value, thus preventing moisture accumulating in the flue and seeping through the wall with consequent damage to the interior wall decorations. This exhausting apparatus F not only draws out and expels the non-condensible gases from the radiating system, but serves to create a small suction or sub-atmospheric pressure in the system which is increased by the vacuum created by condensation of steam in the radiators E. This sub-atmospheric pressure, which extends into the generator A, serves to draw in the combustion air at the burners and also prevents leakage of combustion gases from any part of the system, since leakage (if any occurs) will be of air into the system, due to the sub-atmospheric pressure existing therein.

Referring now more particularly to Figs. 3 to 13 inclusive and 16, the burner and control valve assembly will be described more in detail. The gaseous fuel flows into supply pipe 55, in which is positioned the gas regulator 56, which may be of the well known diaphragm-operated type or any other suitable type. At 57 is a main cut-off valve automatically operated by the primary pilot burner H, as hereinafter described in detail. When valve 57 is closed, the supply of fuel is cut off from all the burners. From the main cut-off valve 57 the gas flows through pipe connection 58 to the electrically operated control valve 59, which is operated by the remote control mechanism C (hereinafter described in detail) to completely cut off or to regulate the volume of the gas flow through pipe 60 to a second automatically operated cut-off valve 61. This valve 61 is operated by a thermostatic control mechanism responsive to the intensity of the flame of a second pilot or control burner, indicated generally at K, the construction and operation of this control mechanism being hereinafter described more in detail. From cut-off valve 61 the gas flows through pipe connection 62 to the main burner G.

This main burner G (see Fig. 10) comprises a housing 63 in which is formed a gas chamber 64 with which the supply pipe 62 communicates. The gas flows through nozzle 65 into the mixing chamber 66, the volume of the gas flow being controlled by the tapered regulating plug 67 carried by adjusting screw 68. Air is admitted to mixing chamber 66 through the annular opening 69 between the open rear end of mixing chamber 66 and the adjustable closure cap or head 70. The combustible mixture flows through tube 71 to the outlet member 72 of restricted diameter, in the tapering approach to which is a series of holes or openings 73 for the purpose of securing intimate mixing of the air and gas, keeping the flame from blowing off the end and going out. The combustion takes place or the flame forms beyond the end 74 of the burner, the flame being projected through tangential opening 13 into the combustion chamber 12, as already described.

Inasmuch as the number of radiators in use affects the rate of condensation and also the suction produced by the exhauster, it will be evident that the turning on or off of radiators automatically varies the quantity of heating medium produced in the generator as the result of varying the resistance to fluid flow into and through the system, which in turn varies the quantity of air flowing through the burners and inlet opening 13.

Returning now to the control valves, the primary pilot burner H and main cut-off valve 57 will first be described, referring more particularly to Figs. 3, 4, 7, 8, and 9. The supporting tube 75 projects from the casing or housing 76, which extends upwardly from the housing of cut-off valve 57. The fuel supply tube or conduit 77 projects through tubular casing 75 and is provided at its outer end with the burner opening 78 where the pilot flame is formed which projects across the outlet end of the main burner G, so as to serve to ignite the main burner (see Fig. 4). The thermostatic operating member comprises a thermal tube 79 mounted at its inner end in casing 76 and projecting at its outer end into the path of the flame of the pilot burner, so that when the pilot burner is in operation, tube 79 will be heated and will expand, thereby drawing out a rod 80 which is slidably mounted within the tube 79 and secured thereto at its outer end 81. At the inner end of rod 80 is a knife edge thrust member 82 bearing against an intermediate portion of a lever 83 fulcrumed at its upper end on a knife-edge 84 carried by a fixed bracket member 85. The lower forked end 86 of lever 83 bears against one end of a compression spring 87 mounted on the outer end portion of the valve stem 88. The valve 57 opens when stem 88 is moved toward the right and is closed when stem 88 is moved toward the left. The spring 89 on the inner portion of stem 88 tends to open the valve, but when tube 79 is closed and lever 83 is moved toward the left (as shown in the drawings), the consequent compression of spring 87 will cause this spring to overcome the force of spring 89 and close the valve 57. When the pilot flame is burning, the tube 79 will be heated and will expand so as to draw rod 80 to the right (Fig. 7) thus permitting lever 83 to swing toward the right and relieving the compression of spring 87, thus permitting spring 89 to open the valve 57. The fuel supply pipe 77 for the pilot burner communicates with a passage 90 formed in casing 76, into which is connected the supply pipe 91 leading from the three-way fitting 92. Supply pipe 93 leads to this fitting 92 from the inlet side of the housing of electrically-operated valve 59 (see Fig. 13) so that as long as main cut-off valve 57 is open, fuel gas will flow to the pilot burner H through pipe 58, valve housing 59, pipe 93, fitting 92, pipe 91, passage 90, and supply pipe 77. However, when main cut-off valve 57 is closed, this fuel supply connection for the pilot burner H will be cut off, so that an auxiliary connection must be provided for supplying fuel to this pilot burner when it is first lighted and until the thermostatic tube 79 has been expanded to permit the opening of cut-off valve 57. For this purpose, an auxiliary supply pipe 94 leads from the main gas supply pipe 55 at the inlet side of cut-off valve 57 into the three-way fitting 92. A normally closed push-button valve 95 is positioned in this auxiliary supply pipe 94. When the apparatus is first put into operation, the operator will push down the button valve 95, thus permitting a flow of fuel to the pilot burner from pipe 55, through pipe 94, fitting 92, pipe 91, passage 90 and pipe 77 to the burner opening 78 where the gas is ignited by any suitable means. The operator must hold the push button valve 95 open until the flame at 78 has heated up thermostatic tube 79 sufficiently to permit the main cut-off valve 57 to open. As soon as valve 57 has opened, gas will flow through the pipe connections first described to supply the pilot burner and the push button valve 95 may be permitted to return to its normally closed position. There will now be a continuous flow of fuel to the pilot burner H as long as valve 57 remains open, and valve 57 will remain open as long as the pilot burner is in operation. Therefore, this pilot burner will normally burn constantly, but if for any reason it should be extinguished, the main cut-off valve 57 will automatically close and the supply of fuel will be entirely cut off to all of the burners, including the main burner G, the primary pilot H and the auxiliary pilot K, hereinafter described.

The electrically operated remote control valve system C will now be described, referring more particularly to Figs. 3, 9, 11, 12, 13 and 16.

The gas flows through pipe or conduit 58 into the main gas chamber 96 in valve housing 59. A cylindrical bushing 97 is fixed in this housing, and is formed with a main gas passage 98 communicating with chamber 96, also with a smaller passage 99 and with a still more restricted passage 100, the three openings 98, 99 and 100 being positioned at 90° from one another about the circumference of bushing 97, the fourth side 101 of the bushing being completely closed. An annular passage 102 is formed in housing 59 around the central portion of bushing 97 so as to permit gas to flow from chamber 96 to and through the respective openings 99 and 100. Adjusting screws 103 and 104 are mounted in housing 59 in position to regulate the size of the inlet openings 99 and 100, respectively. A hollow cylindrical valve member 105 is rotatably fitted within bushing 97 and is provided with an opening 106 adapted to register selectively with any one of the openings 98, 99 or 100 in the bushing or to be presented against the closed side 101 of the bushing, in which latter position the flow of gas through the valve will be completely cut off. The valve member 105 is closed at one end by a head 107 which also closes this end of the bushing 97, the opposite ends of the bushing 97 and valve member 105 being open to permit the gas to flow out through the housing extension 108 and the conduit 60 fitted therein. It will now be apparent that this valve is to be adjusted successively to four different positions by successive rotary movements of 90° in a clockwise direction as seen in Fig. 13. In the position shown in the drawings, the valve is completely closed. When rotated through 90° so that the opening 106 in the rotatable valve member 105 registers with the larger opening 98 in bushing 97, a substantially unrestricted flow of gas through the valve is permitted. Another adjustment of 90° brings opening 106 into register with the smaller opening 99 to permit a more restricted flow of gas through the valve. When moved to the third position a still smaller flow of gas through restricted opening 100 is permitted. In the final or fourth position, as shown in the drawings, the valve is closed. In order to automatically accomplish these rotary adjustments of the valve, four pins 108 project from the head 107 into the enclosing housing 109, the pins being spaced at 90° from one another about the axis of rotation of the valve member. A lever 110 intermediately fulcrumed at 111 within housing 109 has its lower arm pivotally connected at 112 with the outer end of the core or armature 113 of a solenoid or electro-magnet 114. A pawl 115 having one hooked end 116 adapted to engage any one of the pins 108, is pivotally mounted at its other end 117 on the upper end of intermediately pivoted lever 110. A coiled contractile spring 118 is anchored at one end 119 in the housing 109 and is secured at its other end to an upwardly projecting lug 120 formed on pawl 115 near its pivoted end 117. This spring 118 tends to return the parts to the position shown in Fig. 11 when solenoid 114 is de-energized, and also tends to swing the hooked end of pawl 115 downwardly so as to always be in position to engage one of the pins 108.

Referring now for the moment to the wiring diagram shown in Fig. 16, 121 and 122 indicate electric mains through which current is supplied to the transformer 123. Current flows from transformer 123 through wires 124, 125 and 126 to one side of the push button 127 of the control mechanism C, which may be positioned at any convenient position within the building to be heated. From push button 127 the circuit is completed through wire 128, coil of solenoid 114, and wire 129 back to the transformer 123. Whenever push button 127 is closed, the magnet or solenoid 114 will be energized, thus drawing in coil 113 and through lever 110, moving pawl 115 to the right (Fig. 11), thereby turning the rotary assembly of the valve through an arc of 90°. When the push button 127 is released, the magnet 114 will be de-energized and spring 118 will return the parts to the position shown in Fig. 11, the beveled end 116' of pawl 115 sliding up over the next succeeding pin 108 until the hooked end of the pawl can be moved down into engagement with this pin through the effort of spring 118 exerted on lug 120 of the pawl. The next time push button 127 is closed, the same cycle of events will be repeated and the rotary assembly will be shifted in the same direction through another arc of 90°.

A pair of signal lights, which may conveniently comprise a lower red light 130 and an upper white light 131, are preferably mounted adjacent the push button 127 as a part of the control mechanism C, as indicated in Fig. 1. A spindle 132 projects outwardly from rotary head 107, and a spring contact member 133 is constantly in engagement with this spindle, this spring contact being connected through wire 134 with one side of transformer 123. A pair of contact pins 135 and 136 mounted in spindle 132 and spaced 180° apart are adapted to alternatively contact with the spring contact member 137 which is connected through wire 138 with one terminal of the signal light 131, the other terminal of this light being connected through wires 139 and 124 with one side of transformer 123. A similar pair of contact pins 140 and 141, spaced 90° apart, are adapted to contact with spring contact member 142 connected through wire 143 with one terminal of signal light 130, the other side of this light being connected through wires 144, 125 and 124 with the transformer 123. A disc 145 of insulating material is fixedly mounted on spindle 132, this disc having one flat side 146 which is presented upwardly, as shown in Fig. 11, when the valve is in closed position. A movable contact member 147 will be held in engagement with a fixed contact member 148 as long as the spring arm 149 which carries the movable contact 147 is held up by the cylindrical periphery of the disc 145 on which it rests. Whenever the flat face 146 of disc 145 is uppermost, this spring arm 149 will be permitted to move downwardly, thereby breaking the circuit by disengaging the contacts 147 and 148. One of these contacts is connected through wire 150 with one of the electrical mains 121. The other contact is connected through wire 151 with one side of the exhauster motor 51, the other terminal of this motor being connected through wire 152 with the other electrical main 122. It will now be apparent that as long as the contacts 147 and 148 are held in engagement, the exhauster motor 51 will operate, but when the contact between members 147 and 148 is broken, the motor 51 will be de-energized and the exhauster fan 50 will cease to operate.

The rotary assembly comprising the valve sleeve 105 and the spindle 132 and the contact members carried thereby rotates intermittently in a clockwise direction, as seen in Figs. 11 and 13. In the first or "off" position, with all parts at rest or not functioning, this rotary assembly will be positioned as shown in the drawings. At this time the valve 59 will be closed and no gas will flow to the burners since closed portions of the valve sleeve 105 will cover the several inlet ports 98, 99 and 100. At this time the spring arm 149 will be resting on the flat side of disc 145 so that contacts 147 and 148 will be separated and the exhauster motor 51 will be de-energized and the fan 50 will not be operating. At this time none of the contact pins or fingers 135, 136, 140 or 141 will be in engagement with the spring contacts 137 or 142 so that neither of the signal lights 130 or 131 will be illuminated.

With the parts in the positions just described, if push button 127 is closed, the solenoid 114 will be energized, acting through the lever and pawl mechanism, already described, to swing the rotary assembly through an arc of 90°. The valve will now be opened to its maximum by bringing the port 106 in the valve sleeve 105 into register with the main gas passage 98. The cylindrical surface of disc 145 will be moved under the spring arm 149 so as to close the contacts 147 and 148, thus causing the exhausting mechanism F to operate. The two contact fingers 135 and 140 will be moved into engagement with the spring contacts 137 and 142, thereby causing both signal lamps 130 and 131 to be lighted. The two lights burning simultaneously indicate that the main burner is being supplied with a maximum flow of gas.

If it is desired to restrict the flow of gas to the main burner D and thus cut down the heat output, button 127 will be closed a second time, thereby moving the rotary parts through a second arc of 90°. This will bring the port 106 into registry with the port 99, so that only a reduced flow of gas to the burner is permitted through the valve. The contact fingers 135 and 140 will be moved out of engagement with spring fingers 137 and 142, but the single contact finger 141 will be moved into engagement with spring contact 142 so as to continue the illumination of the lower light 130. The upper light 131 will not be illuminated at this time, and the single signal light 130 will indicate that the intermediate or reduced heat is on. The exhauster will continue to function as before (the cylindrical surface of disc 145 still remains in engagement with spring arm 149).

A third operation of push button 127 will move the valve through a further arc of 90°, thus bringing port 106 into registry with the restricted opening 100 so that only a very limited flow of gas is permitted to the main burner. However, the exhauster will continue to operate as before.

At this time, contact finger 141 will be moved out of engagement with spring contact 142, but the finger 136 will now be moved into engagement with spring contact 137. This will cause the illumination of the upper signal light 131 only, thereby indicating that the burner is now adjusted for the most restricted heat production.

A fourth operation of push button 127 will complete the cycle and return all of the parts to the position shown in the drawings. In this position both signal lights are out, the valve is completely closed, and the exhauster F is not in operation.

From valve 59 the gas flows through pipe 60 to the cut-off valve 61, which is under the control of the secondary pilot or control burner K (see particularly Figs. 3, 4, 5, 6 and 16). The housing of valve 61 is formed with an internal web 153 provided with valve passage 154, at the inlet end of which is valve seat 155, against which seat the movable valve member 156 is carried by ball-joint 157 at the inner end of valve stem 158. Valve stem 158 projects through a sealing means indicated generally at 159, the outer end of the stem being positioned in a housing, indicated at 160. The housing 160 contains a quick-acting mechanism for moving the valve member 156 quickly and positively from opened to closed positions or vice versa. This mechanism comprises a lever 161 having a knife edge 162 at its lower end fulcrumed against a fixed abutment in the housing 160, and having a knife edge 163 at its upper end engaging a plate 164 at the lower end of compression spring 165, which engages at its upper end a plate 166 fulcrumed against the knife-edge 167. It will now be apparent that when lever 161 is swung to either side of a vertical or dead-center position, the expansion of spring 165 will snap the lever quickly to its limit of movement at that side of the vertical. A pair of knife-edges 168 and 169 on the upper arm of lever 161 alternatively engage adjustable washers 170 and 171 mounted on valve stem 158, so that the snap action movement of lever 161 to one side or the other of the vertical will move the valve stem 158 and consequently move valve member 156 to open or closed positions. An operating rod 172 is pivotally connected at one end, 173, to lever 161, this rod projecting out through a tubular housing 174 attached to the housing 160. At the outer end of tubular housing 174 is mounted the flue housing 175 which is positioned substantially horizontally and is formed with one closed end 176 and an elbow 177 at the other end, having an upper opening 178 positioned adjacent the outlet of main burner G (see Fig. 4). The flue housing is provided with small air or draft openings, indicated at 179 and 180, so that the suction of the combustion air being drawn into the generator combustion chamber at 13, will cause a draft or flow of air into flue housing 175 through openings 179 and 180 and out through the open end 178. The outer end of operating rod 172 is pivotally connected at 181 to the free end of a bi-metallic thermostatic bar 182 which is fixed at its other end 183 within the flue housing 175. The burner 184 is mounted in the inner wall of housing 175 and is supplied with gaseous fuel through tube 185, as hereinafter described.

When the exhausting mechanism F is not operating, the draft through housing 175 will be so small that the flame 186 of burner 184 will burn lazily, as indicated in solid lines in Fig. 5, and will have no substantial heating effect on thermostatic element 182, at least not enough to move the valve member, which will remain closed, as shown in the drawings. However, as soon as the exhausting mechanism is started into operation, the draft through flue 175 will be increased so that the burner flame will be intensified, as indicated in dotted lines at 186, thus heating the bi-metallic thermostatic bar 182, so that it will bend out, substantially as indicated in dotted lines, and thus move lever 161 past its dead-center position so that the snap action will open the valve 61. When the exhausting mechanism ceases to operate, the flame of burner 184 will return to its lazy position and the consequent cooling of thermostatic bar 182 will cause valve 61 to be automatically closed. It will be apparent that when valve 61 is closed, the flow of gas to main burner G through pipe 62 will be cut off. It will be apparent that the action of this thermostatic valve operating mechanism will not be instantaneous, and a slight time interval will elapse after the exhausting mechanism has been turned on, before the valve 61 is open to establish a gas flow through the main burner. This affords an opportunity for an air current to be established in the proper direction and prevents the possibility of back-drafts which might occur before the fan operation had been fully established.

A gas supply conduit 187 is connected through fitting 188 with an extension 189 of valve housing 61 at the inlet side of the valve so that the flow of gas through conduit 187 will be uninterrupted, regardless of the open or closed position of valve member 156. This conduit 187 leads to the thermostatic control valve D (see Figs. 1, 14 and 16), and the conduit 185 leads from this control valve to the burner 184, so that as long as control valve D is open, a continuous flow of gas will be established to the auxiliary pilot burner K. In the example now being described, the thermostatic valve D is positioned in or adjacent to the conduit 49, through which the exhaust gases are drawn into the suction fan 50, so that this valve will be responsive to the temperature of these exhaust gases. A type of valve well suited for this purpose is shown in Figs. 14 and 16. Within the casing 190 is mounted the valve housing 191, in which is valve seat 192 with which co-operates the movable valve member 193. The spring 194 tends to open this valve, and the valve is closed by an inward pressure on plug 195, which projects through the sealing diaphragm 196. The inlet and outlet conduits 187 and 185 connect with the two sides of this valve. The thermostatic bar 197 bears at its upper end against plug 195 and is mounted at its lower end on the carrier 198 which is pivoted at 199 on the fixed bracket arm 200. A link 201 is pivoted at 202 to an intermediate portion of lever 203, also fulcrumed at 199, the other end of link 201 being adjustably connected by means of nuts 204 and 205, with an intermediate portion of pivoted carrier 198. The mechanism may be adjusted by moving the nuts 204 and 205 on the threaded portion of link 201. A regulating lever 206, positioned outside of casing 190, is fixed on a shaft 207 and its upper end is adjustable along a temperature scale or index 208. A short lever arm 209 within the casing, fixed on shaft 207, is pivotally connected at 210 with the lower end of lever 203. It will now be apparent that a movement of the adjusting or regulating lever 206 along scale 208 will, through the link and lever connections described, cause a very small movement of carrier 198 and the thermostatic bar 197 carried thereby. When thermostatic bar 197 is heated, it will swing toward the right (Fig. 14) so as to close the valve, and the temperature at which this closure will take place is determined by the adjustment of regulating lever 206.

It will now be understood that when the exhaust gases drawn into fan 50 are too hot, thus indicating that excess heat is being furnished to the radiating system, the valve D will automatically close, thus cutting off the supply of fuel to auxiliary pilot burner K. The thermostatic bar 182 will then cool or contract and cause valve 61 to be automatically closed, thus cutting off the supply of fuel to the main burner G. When the exhaust gases commence to come through cool from the radiating system, the valve D will be automatically opened, thus re-establishing the supply of fuel to burner 184. The flame will be re-ignited at the outlet 178 from the constantly burning main pilot H, and as soon as pilot flame 186 has heated up the thermostatic bar 182, the valve 61 will again be opened to re-establish the supply of fuel to main burner G, which will also be ignited from the constantly burning pilot H.

Instead of positioning the valve D so as to be responsive to the temperature of the exhaust gases, the valve could be positioned as indicated at D' (Fig. 1) so as to respond to the temperature established at any desired point within the building. When the desired temperature had been reached, the valve D' will cut off the supply of fuel to pilot burner K, which will in turn cause the supply of fuel to main burner G to be cut off, so that the generation of heating medium will be temporarily discontinued or diminished. Alternatively, both valves D and D' can be arranged in series in the supply conduit for burner K, or a plurality of such thermostatic valves can be so used, any one of which will serve to cut off the supply of fuel to the auxiliary pilot when a certain maximum temperature has been reached at any of the locations where these valves are positioned.

In starting this heating apparatus originally, or after a period of dis-use, the push button valve 95 must be depressed and the primary pilot H ignited at 78. The push-button 95 must be held depressed until the valve 57 has been automatically opened by the thermostatic mechanism 77, after which the push button valve may be released and the primary pilot will continue to burn. If the push button control switch 127 is now pressed once, a maximum flow of gas will be established through valve 59 and the exhausting mechanism F will be started into operation. Gas will now flow to the secondary pilot K, which will be ignited from the primary pilot H, and, since the fan is in operation, the flame of the secondary pilot will burn with sufficient intensity to cause the valve 61 to be automatically opened after a short time interval, thus establishing a flow of fuel to the main burner G which will in turn be ignited from the primary pilot H. Heating medium will now be generated and will flow into the radiators E, the non-condensable gases being drawn out by exhausting mechanism F and expelled into flue 53. If these gases come through hot, thus indicating that excess heat is being generated, the valve D will automatically cut off the supply of fuel to the secondary pilot K, which in turn will temporarily cut off the flow of fuel to main burner G, as already described. If a diminished heating action is desirable, the push button 127 may be actuated a second time, or even a third time, to successively restrict the flow of gas to the main burner. A fourth actuation of push button 127 will entirely close valve 59 and stop the exhausting mechanism F. The burners H and G will continue to burn until the conduit beyond valve 59 has been cleared of gas, and valve 61 will automatically close, after a short time interval.

If, for any reason, the exhausting mechanism should cease to operate at any time, the draft through flue housing 175 will at once be cut down so that the auxiliary pilot K and its cooperating thermostatic mechanism will cause valve 61 to be closed and main burner G will cease to function. The auxiliary pilot K will, however, continue to burn lazily and will cause valve 61 to be automatically opened when the fan is again started in operation. The main pilot H will normally burn constantly, even though all of the other mechanism has been rendered inoperative. However, if this primary pilot should be extinguished by a back-fire or for any other reason, the co-operating thermostatic mechanism will cause cut-off valve 57 to be closed, thus shutting off the supply of fuel to all of the burners, including the primary pilot H.

Emergency pressure relief valves and observation ports may be installed in each of the supply and return sides of the system. In Fig. 2, the valve casing 211 has a lower flange 212 for attachment to the top 16 of the generator, and is internally threaded in its upper end to receive the supply main 18. The casing 211 is formed internally so that water will drip downward out of the casing. The flap or closure 213 is hinged at its upper edge 214, and rests upon the inclined seat 215 so that it will be held shut by gravity, also by the outer atmospheric pressure when the system is normally operating under a partial vacuum. The flap 213 should be thick enough not to warp under the temperatures to which it is subjected, and may, if desired, be made of brass or other non-corrosive metal to prevent rusting shut. If, for any reason, super-atmospheric pressures should be developed in the system, this flap valve will blow open and relieve pressure. The flap 213 may also be raised at any time for observation purposes.

A similar flap valve 216 is positioned in the return main, for example above the connection with pipe 49, as shown in Fig. 1. This valve may be of essentially the same construction as the valve 211, already described.

If desired, a small vent pipe 217 leading from casing 1 into flue 53 may be provided to vent gases from the constantly burning pilot when the generator is not in operation.

The inside of all metal parts, such as the generator and the piping, which are subject to the corrosive action of the combustion gases, may be provided with a vitreous coating or other form of rust-proofing. This corrosive action is largely caused by excess of air in the system, and since this improved system operates under a partial vacuum, excess air is practically eliminated and corrosion is minimized.

Referring now to Figs. 17, 18 and 19, certain modifications of the heating apparatus will be described. In Fig. 17, the assembly shown is much the same as that already described, except that the secondary control pilot K and cut-off valve 61 are omitted, and a solenoid operated cut-off valve 218, of any standard type is inserted in the gas line between the first cut-off valve 57 and the electrically operated control valve 59. The solenoid valve 218 is under the control of an automatic blow-back switch 219, best shown in Fig. 18. This switch comprises a housing 220, in which are mounted the spaced apart fixed contacts 221 and 222, with which are connected the wires 223 and 224, respectively. A bridge plate 225 is yieldably carried at the bottom of a plunger 227, which normally tends to be lifted by spring means so as to break the circuit by lifting bridge plate 225 from the fixed contacts 221 and 222. The switch is closed by depressing the plunger at 228, whereupon the spring pawl 229 will engage the normally non-rotating ratchet wheel 230 to lock the plunger in depressed position with the switch closed. The ratchet wheel 230 is fixed by means of a fusible solder of low melting point, indicated at 231, on the inner end of a copper rod 232, the outer end of which extends adjacent the outlet end of main burner G. In case the burners back-fire for any reason, or the flames burn back at the outlet orifice of the main burner, due to poor draft conditions, the copper rod or tube 232 will become heated so as to melt the fusible metal 231 and permit ratchet 230 to rotate so that the locking mechanism will no longer be effective and plunger 227 will be raised by its spring so as to break the circuit. The solenoid of valve 218 will thus be de-energized so that it will automatically close and cut off the fuel supply to the burners.

The wiring diagram shown in Fig. 19 shows the connection for the element just described, with the addition of a thermostatically operated circuit breaker 233, which may be located at any desired point in the system. Parts of the wiring connection not specifically referred to may be the same as in the wiring diagram shown in Fig. 16, and already described. The solenoid operated valve 218 is connected by wires 234 and 235 in parallel with the operating circuit of exhauster motor 51. The thermostatic circuit breaker, indicated generally at 233, (which may be of any suitable type) is connected in one of the wires such as 151 of the motor-operating circuit. In case an abnormal heat is reached at any point where circuit breaker 233 may be located, the thermostatic mechanism will operate to break the circuit, whereupon motor 51 and solenoid 218 will be de-energized so that the exhauster mechanism will cease operating and the solenoid valve 218 will automatically cut off the flow of fuel to the burners. The safety switch 219 is located in one of the main circuit wires, such as 122, so that if this switch is opened by a blow-back from the generator, all of the circuits will be broken and the valve 218 will be automatically closed.

Figure 20:
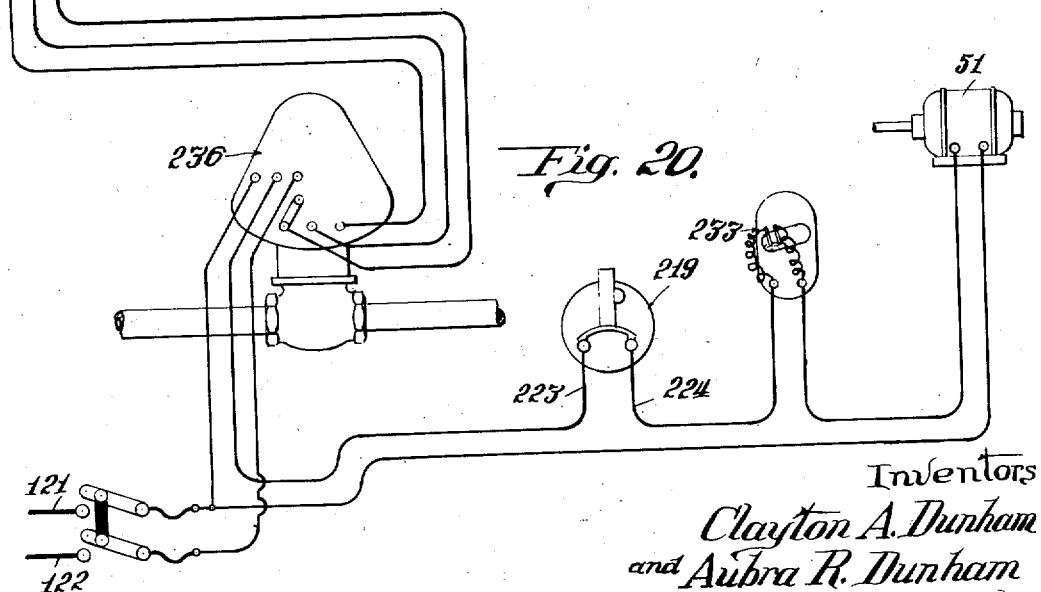
Fig. 20 is a wiring diagram showing another modification of the control mechanism.

In the modification shown by the wiring diagram of Fig. 20, a motorized gas valve 236 of standard type and controlled by the thermostat 237, located at any desired position in the building, serves to cut the fuel supply on and off at certain predetermined temperatures. This motorized gas valve includes a safety cut-out valve which will close when the operating circuits are broken. The valve 236 therefore takes the place of the push button control mechanism first described, as well as the safety solenoid valve 218. As indicated, the safety thermostatically operated circut breakers 219 and 233 are included in the operating circuit for motor 51 and motorized valve 236, so that the exhausting mechanism will be stopped and the fuel supply cut off whenever either of these thermostatic devices are subjected to abnormal temperatures. It will be apparent that various other combinations of the several safety features hereinabove described could be formed without departing from the principles of this invention.

The specific generator herein disclosed and the specific process of generating the heating medium are not claimed herein but are disclosed and claimed in our co-pending application Serial No. 759,966, filed December 31, 1934.

We claim:

1. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, and automatically controlling the combustion by respectively increasing or decreasing the supply of fuel in response to an increase or decrease in the suction produced at the inlet to the combustion space.

2. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium and producing a suction for drawing fuel and combustion air into the combustion space, returning the condensate to the combustion space, maintaining a main combustion flame and an auxiliary pilot flame at the inlet to the combustion space, increasing or decreasing the intensity of the pilot flame in accordance with corresponding variations in the suction produced at the inlet, and increasing or decreasing the supply of fuel to the main flame in response to an increase or decrease respectively in the intensity of the pilot flame.

3. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium and producing a suction for drawing fuel and combustion air into the combustion space, returning the condensate to the combustion space, maintaining a main combustion flame and an auxiliary pilot flame at the inlet to the combustion space, increasing or decreasing the intensity of the pilot flame in accordance with corresponding variations in the suction produced at the inlet and also in response to a decrease or increase respectively in the temperature of the gases exhausted from the condensing space, and increasing or decreasing the supply of fuel to the main flame in response to an increase or decrease respectively in the intensity of the pilot flame.

4. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium and producing a suction for drawing fuel and combustion air into the combustion space, returning the condensate to the combustion space, maintaining a main combustion flame and an auxiliary pilot flame at the inlet to the combustion space, increasing or decreasing the intensity of the pilot flame in accordance with corresponding variations in the suction produced at the inlet, and also in accordance with a predetermined increase or decrease in the quantity of heat given out from the condensing space, and increasing or decreasing the supply of fuel to the main flame in response to an increase or decrease respectively in the intensity of the pilot flame.

5. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, and intermittently stopping or starting the combustion in response to a decrease or increase respectively in the suction produced at the inlet to the combustion space.

6. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, there being a main combustion flame and an auxiliary pilot flame utilized at the inlet to the combustion space, increasing or decreasing the intensity of the pilot flame in response to an increase or decrease respectively of the suction produced at the inlet to the combustion space, and stopping the supply of fuel to the main flame by a decrease in the intensity of the pilot flame and renewing the supply of fuel to the main flame by an increase in the intensity of the pilot flame.

7. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, there being a main combustion flame, a constantly burning pilot flame and an auxiliary pilot flame utilized at the inlet to the combustion space, stopping or renewing the supply of fuel to the auxiliary pilot flame in response to a predetermined increase or decrease in the temperature of the exhausted gases, and stopping or renewing the supply of fuel to the main flame in response to the extinguishing or relighting of the auxiliary pilot flame.

8. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, there being a main combustion flame, a constantly burning pilot flame and an auxiliary pilot flame utilized at the inlet to the combustion space, stopping or renewing the supply of fuel to the auxiliary pilot flame in response to a predetermined increase or decrease in the quantity of heat given out from the condensing space, and stopping or renewing the supply of fuel to the main flame in response to the extinguishing or relighting of the auxiliary pilot flame.

9. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, there being a main combustion flame, a constantly burning pilot flame and an auxiliary pilot flame utilized at the inlet to the combustion space, increasing or decreasing the intensity of the auxiliary pilot flame in response to an increase or decrease of the suction produced at the inlet to the combustion space, stopping or renewing the supply of fuel to the auxiliary pilot flame in response to a predetermined increase or decrease in the quantity of heat given out from the condensing space, and stopping or renewing the supply of fuel to the main flame in response to a decrease or increase in the intensity of the auxiliary pilot flame.

10. The method of heating consisting in burning fuel in the presence of water in a closed combustion space to produce a partially condensable heating medium consisting of products of combustion and steam, the combustion space being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, there being a main combustion flame, a constantly burning pilot flame and an auxiliary pilot flame utilized at the inlet to the combustion space, increasing or decreasing the intensity of the auxiliary pilot flame in response to an increase or decrease of the suction produced at the inlet to the combustion space, stopping or renewing the supply of fuel to the auxiliary pilot flame in response to a predetermined increase or decrease in the temperature of the exhausted gases, and stopping or renewing the supply of fuel to the main flame in response to a decrease or increase in the intensity of the auxiliary pilot flame.

CLAYTON A. DUNHAM.
AUBRA R. DUNHAM.

CERTIFICATE OF CORRECTION.

Patent No. 2,047,015.                                              July 7, 1936.

CLAYTON A. DUNHAM, ET AL.

It is hereby certified that error appears in the printed specification of the above numbered patent requiring correction as follows: Page 1, second column, line 37, beginning with the word "Another" strike out all to and including the word and period "generator." in line 40; and that the said Letters Patent should be read with this correction therein that the same may conform to the record of the case in the Patent Office.

Signed and sealed this 6th day of October, A. D. 1936.

(Seal)
Henry Van Arsdale
Acting Commissioner of Patents.

being connected with a condensing space into which the heating medium is introduced, exhausting the cooled non-condensable gases from the condensing space and thereby maintaining a partial vacuum in the condensing and combustion spaces, causing circulation of the heating medium, and producing a suction for drawing fuel and combustion air into the combustion space, returning the condensate to the combustion space, there being a main combustion flame, a constantly burning pilot flame and an auxiliary pilot flame utilized at the inlet to the combustion space, increasing or decreasing the intensity of the auxiliary pilot flame in response to an increase or decrease of the suction produced at the inlet to the combustion space, stopping or renewing the supply of fuel to the auxiliary pilot flame in response to a predetermined increase or decrease in the temperature of the exhausted gases, and stopping or renewing the supply of fuel to the main flame in response to a decrease or increase in the intensity of the auxiliary pilot flame.

CLAYTON A. DUNHAM.
AUBRA R. DUNHAM.

CERTIFICATE OF CORRECTION.

Patent No. 2,047,015.  July 7, 1936.

CLAYTON A. DUNHAM, ET AL.

It is hereby certified that error appears in the printed specification of the above numbered patent requiring correction as follows: Page 1, second column, line 37, beginning with the word "Another" strike out all to and including the word and period "generator." in line 40; and that the said Letters Patent should be read with this correction therein that the same may conform to the record of the case in the Patent Office.

Signed and sealed this 6th day of October, A. D. 1936.

(Seal)

Henry Van Arsdale
Acting Commissioner of Patents.

CERTIFICATE OF CORRECTION.

Patent No. 2,047,015.  July 7, 1936.

CLAYTON A. DUNHAM, ET AL.

It is hereby certified that error appears in the printed specification of the above numbered patent requiring correction as follows: Page 1, second column, line 37, beginning with the word "Another" strike out all to and including the word and period "generator." in line 40; and that the said Letters Patent should be read with this correction therein that the same may conform to the record of the case in the Patent Office.

Signed and sealed this 6th day of October, A. D. 1936.

(Seal)

Henry Van Arsdale
Acting Commissioner of Patents.